United States Patent [19]

Krebs

[11] Patent Number: 4,472,916

[45] Date of Patent: Sep. 25, 1984

[54] PRE-FABRICATED HOUSE CONSTRUCTION

[76] Inventor: Arthur Krebs, Rennweg, 8633 Wolfhausen, Switzerland

[21] Appl. No.: 265,591

[22] Filed: May 20, 1981

[30] Foreign Application Priority Data

Jun. 2, 1980 [CH] Switzerland .......................... 4254/80
Oct. 9, 1980 [CH] Switzerland .......................... 7547/80

[51] Int. Cl.³ .......................... E04H 9/02; E04B 2/28; E02D 27/00

[52] U.S. Cl. ........................................ 52/236.6; 52/23; 52/93; 52/143; 52/148; 52/167; 52/169.1; 52/227; 52/263; 52/289; 52/299; 52/404; 52/408; 52/480; 52/481; 52/762; 403/174; 403/178; 403/217; 403/231; 403/260

[58] Field of Search .................... 52/90, 92, 93, 299, 52/301, 227, 481, 762, 236.6, 236.7, 588, 224, 248, 293, 167, 169.1; 403/174, 178, 217, 231, 260; 411/419, 418, 417

[56] References Cited

U.S. PATENT DOCUMENTS

| 167,118 | 8/1875 | Pritchett | 403/260 X |
|---|---|---|---|
| 2,078,968 | 5/1937 | Patterson | 52/93 |
| 3,004,302 | 10/1961 | Nightingale | 52/293 X |
| 3,330,084 | 7/1967 | Russell | 52/92 X |
| 3,333,383 | 8/1967 | Raudebaugh, Jr. | 52/588 X |
| 3,423,891 | 1/1969 | Burris | 52/762 |
| 3,601,942 | 8/1971 | Wilson | 52/300 |
| 3,780,481 | 12/1973 | Tomkins | 52/588 X |
| 3,824,750 | 7/1974 | Antoniov | 52/227 X |
| 3,908,329 | 9/1975 | Walters | 52/227 X |
| 4,015,399 | 4/1977 | Prins | 52/747 |
| 4,041,659 | 8/1977 | McElhoe | 52/93 |
| 4,327,529 | 5/1982 | Bigelow, Jr. et al. | 52/34 |

FOREIGN PATENT DOCUMENTS

| 2155852 | 5/1973 | Fed. Rep. of Germany | 52/23 |
|---|---|---|---|
| 986795 | 8/1951 | France | 52/90 |

Primary Examiner—Alfred C. Perham
Attorney, Agent, or Firm—Frishauf, Holtz, Goodman & Woodward

[57] ABSTRACT

A building construction system that permits the erection of a modular-skeleton structure type building in a very short time utilizing relatively unskilled labor. The construction of vertical metal profile posts which extend from the foundation to the horizontal roof girders in a single unit of uniform cross-section. The roof girders are attached by means of slotted tension bolts. The one-piece vertical profile posts have a cross-section which is essentially the combination of a T-section and an U-section. In the lower part of the building, basement wall elements extend into the vertical profile posts with their angled legs on the inside of the building. In this position, they are secured by a bracing tube.

20 Claims, 19 Drawing Figures

PRE-FABRICATED HOUSE CONSTRUCTION

This invention relates to a pre-fabricated house construction and more particularly a modular-skeleton structure building construction that can be quickly assembled from a relatively small number of pre-fabricated components with a minimum input of unskilled labour.

BACKGROUND OF THE INVENTION

There is a strong need in the building construction industry, and particularly the private home construction industry, for a simple, high quality, rigid, stable, storm and earthquake-proof building construction system that utilizes relatively few long lasting components and permits rapid building erection time involving basically unskilled labour. Existing building construction systems in the industrialized world are expensive, complicated, labour intensive and time consuming to erect.

SUMMARY OF THE INVENTION

The applicant's modular-skeleton structure building construction system comprises a skeleton construction combined with grid elements. The materials of construction are mainly long lasting and sturdy non-corrodable metals, wood, plastics and naturally occuring and synthetic materials. The system is versatile in that the modular-type components permit a wide range of individual custom designs to be constructed. The materials used to construct the building are relatively few in number and type (compared to conventional houses) and enable simple and rapid construction because the components are standardized and pre-fabricated.

The applicant's construction system is particularly suitable for private homes (residential blocks, bungalows and detached houses) and for industrial sheds and camps.

The system is believed to be superior to known construction systems because of the short construction time involved and the quality of building that is erected. The system is designed for easy self-assembly by basically unskilled labour, including the owner, since all easy-to-follow assembly plans and drawings are supplied. The system permits flexible designs and individual housing developments to be custom built to suit terrain and individual tastes of consumers.

The structures erected are basically earthquake-proof, since the load-carrying elements are somewhat elastic in nature. The system uses a grid or rastersize design comprising a skeleton-type structure constructed of pre-fabricated elements which can be assembled basically by hand. The grid element construction system does not require the use of heavy lift equipment or a crane at the site.

The grid-type construction system can be disassembled in whole or in part thereby permitting extensions or modifications of the building to be made easily.

The system includes a basement made of aluminium elements construced according to the same system as the super structure which means that all components required to construct and complete building including the basement, can be supplied by one firm. No separate basement contractor is required. The basement elements, by utilizing the same basic materials, permit short construction time and dry construction conditions. The basement includes pre-fabricated windows and window-wells and doors.

The basement construction is of elastic design and as with other components of the building is earthquake-proof. Both basement and living level, including the roof, can be erected cost-effectively and without mortar by labour that is basically unskilled. All aluminium posts and all basement wall elements are of very sturdy design and feature anticapillary connections. Windows, doors and shutters for the main floor are pre-fabricated.

The construction system is fully suitable for complete erection by the buyer. The complete home, including basement, living level and roof structure, can be assembled in only a few days by basically unskilled labour following the assembly plans, drawings and simple construction order.

The system is light-weight, very stable and of dry and hygienic design. Excellent properties are offered for countries where earthquakes are a risk. The skeleton-type structure makes substantial use of aluminium panels in a grid-type structure, and is resistant to termites, timber worms and decay.

The system can be supplied with different facade options, for example:
(a) Plastic cement plaster finish,
(b) Building panels in different colours and shapes,
(c) Conventional timber panels in different forms,
(d) Aluminium panels forming a vapour barrier,
(e) Ready-mixed external plater with glass fibre reinforcement in all colours; and
(f) Tile panelling to form a curtain wall for decoration. This latter option is not earthquake-proof.

The grid-type construction system is particularly well suited for the installation or assembly of standard grid measure doors and windows, including shutters, which do not require modifications.

The construction system includes a stainless-steel hot-air heating system which can be fired with wood. This heating system is suitable for tilted stove and fireplace heating, underfloor and radiator heating. The system can include a reflector-based solar-collector heating system.

The construction system permits every type of home form and layout. All types of roof covers can be used. The type to be used is generally depending on the built-up environment. Roof coverings consisting of clay tiles, plastic tiles or concrete tiles can be used. A corrugated-aluminium roof can be supplied for earthquake-prone regions. The house system can be supplied with different roof options, e.g. saddle roof, sundeck roof, hipped roof, hipped saddle roof.

The elements for the system can be supplied on a turnkey basis, including sanitary fittings and equipment, lavatory and bathrooms, completely equipped kitchens, wall papers, timber ceilings, floor carpets, optional ceramic-tile or wood parquetry floors, and including the complete heating system.

The house components are easily transported from one location to another because parts of the construction elements can be used to crate and containerize other elements of the construction. This significantly reduces packaging costs, which can be a major expense item in conventional systems.

STATEMENT OF THE INVENTION

The house construction of the invention employs a skeleton-type structure which consists of vertical metal profile posts which extend from the foundation of the house to horizontal roof girders in an single unit of uniform cross-section. The roof girders are attached to the vertical metal profile posts by means of slotted tension bolts. The one-piece vertical profile posts have a cross-section which is essentially a T-section. In the lower part of the building, basement wall elements extend into the vertical profile posts with angled legs on the inside of the building. In this position, they are secured by a bracing tube.

House construction using a skeleton-type structure with posts and horizontal girders, are characterised in that the posts are made of metal and are single-unit vertical profile posts, at least a part of supported on a foundation whose uniform cross-section extends from the foundation to the horizontal roof girders, the vertical profiled posts and the horizontal roof girders being interconnected by tension bolts.

A house construction as described wherein each tension bolt penetrates the respective horizontal roof girder and engages in a central section of the vertical profile post with its lower end which is split and the nut of the bolt engages in an opening in the central section.

A house construction as described wherein heat-insulating and stabilizing timber cores are inserted in the upper part of the vertical profile posts on the inner side of the posts.

A house construction as described wherein disassembleable vertically arranged basement wall elements having approximately an U-shaped horizontal cross-section, with two legs extending from the base engaging in a recess in the vertical profile post.

A house construction as described wherein the ends of the legs of the basement wall elements have an U-shaped bend which opens to the outside, with the legs of the neighbouring basement wall elements forming a wedge-shape recess opening to the inside and the leg ends engaging in vertical grooves of the vertical profile posts, being secured in that position by a catch inserted in the recess of the vertical profile post.

A house construction as described wherein the basement wall element accomodates a plate-type protective element between its legs.

A house construction as described wherein a plurality of vertical profile posts are penetrated at least at their upper ends by horizontal steel cables that brace each of the posts.

A house construction as described wherein the horizontal floor girders rest on the upper sides of basement wall elements and are connected with the vertical profile posts by tension elements.

A house construction as described wherein the vertical profile posts support a wall combination consisting of one or more wall elements, comprising a facade element separating wall and an interior wall element.

A building structure of the skeleton structure type with vertical profile posts resting on a foundation, characterized in that the central webs of the vertical profile posts are pierced in the vicinity of the base at least one wire cable which extends parallel to the external walls of the building and which is passed through lower-lying holding devices, the holding devices being fixed in said foundation, and tensioning devices are provided by means of which the wire cable can be tensioned whereby pressure downwardly on the foundation is exerted on the vertical profile posts.

A building structure of the skeleton structure type with vertical profile posts spacially oriented around the walls, including the corners, characterised in that at least the corner vertical profile posts rest on and are guyed onto to a horizontal girder, in the vicinity of the base of the posts by a longitudinally slit tensioning bolt which holds the web of the vertical profile post.

A building structure as described wherein the vertical profile posts are constructed with an I-shaped girder cross-section with bent out flanges by which two of said vertical profile posts are engagable with each other when juxtapositioned with one another in a corner location.

A building structure as described wherein the vertical profile posts have therein substantially H-shaped holes spaced at intervals over at least a part of the length of their web.

A building structure as described wherein the length of the web is at least one and one third times the width of the parallel legs.

A building structure as described wherein on both sides of the space in which the wire cable is located, wall elements made of thermally insulating material are placed, the outer wall element being additionally covered by a facade element.

A building structure, characterised in that basement wall elements with an approximately U-shaped horizontal cross-section are provided when wall elements are juxtapositioned to one another, the bent-out legs on the adjacent basement wall elements defining a V-shaped space, the legs each containing a bowed-out section for a tensioning bolt to pass therethrough, and the basement wall elements each having a hole therein for accomodating a nut or a bolt-head connected to the tensioning bolt.

A building structure as described wherein the basement wall elements rest at the base on the foundations, the V-shaped spaces in the elements are open towards the outside of the building, and the basement wall elements are anchored by means of oblique guying elements.

A building structure as described wherein a transverse bolt passes through the bent-out legs of adjacent basement wall elements and the guying element is a tensioning element which projects into the V-shaped space and is connected to the transverse bolt.

A building structure as described wherein resting on the end face of two adjacent basement wall elements there is a horizontal floor girder through which a tensioning bolt passes, the bolt having therein a longitudinal slit at the top in which the central web of a vertical profile post engages.

A building structure with a roof ridge, characterised in that part of the building is constructed as a transportation container for the remaining parts of the building structure, the transportation container being smaller compared to the finished building structure with regard to its extend in the longitudinal direction of the roof ridge.

BRIEF FIGURE DESCRIPTION

DETAILED DESCRIPTION OF EMBODIMENTS OF THE INVENTION

Figure 1:
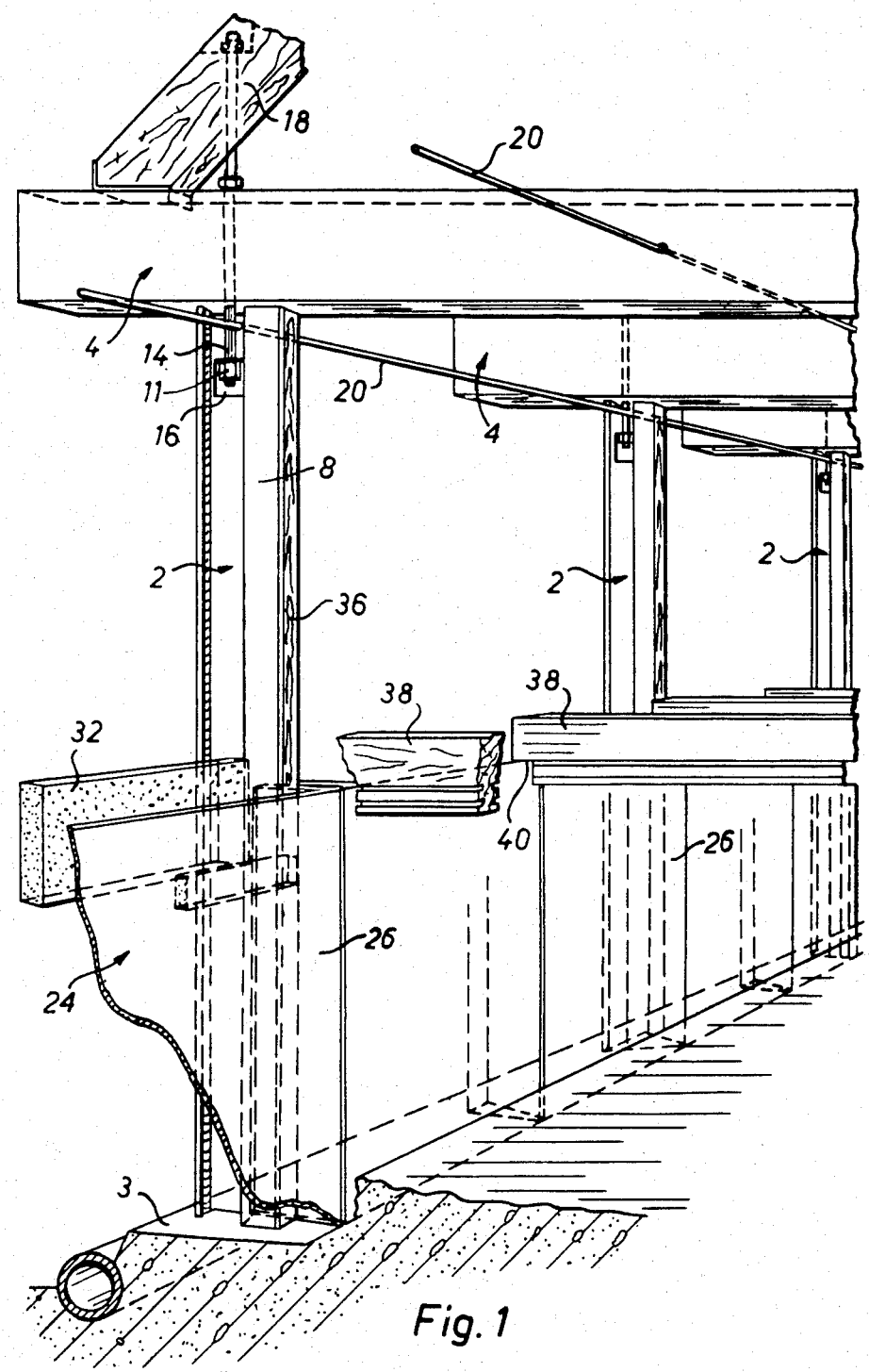
FIG. 1 represents a perspective view of part of the skeleton structure of the building.

The house construction using the skeleton-type design according to the invention, as may be seen in FIG. 1, includes a plurality of vertical profile posts 2 arranged in parallel grid or rastersize form. A plurality of all extend respectively from a foundation 3, which is preferably constructed of masonry work, to corresponding horizontal roof girders 4. The vertical profile posts 2 have a uniform cross-section throughout, and are constructed of a single piece of metal, preferably aluminium or steel.

Figure 3:
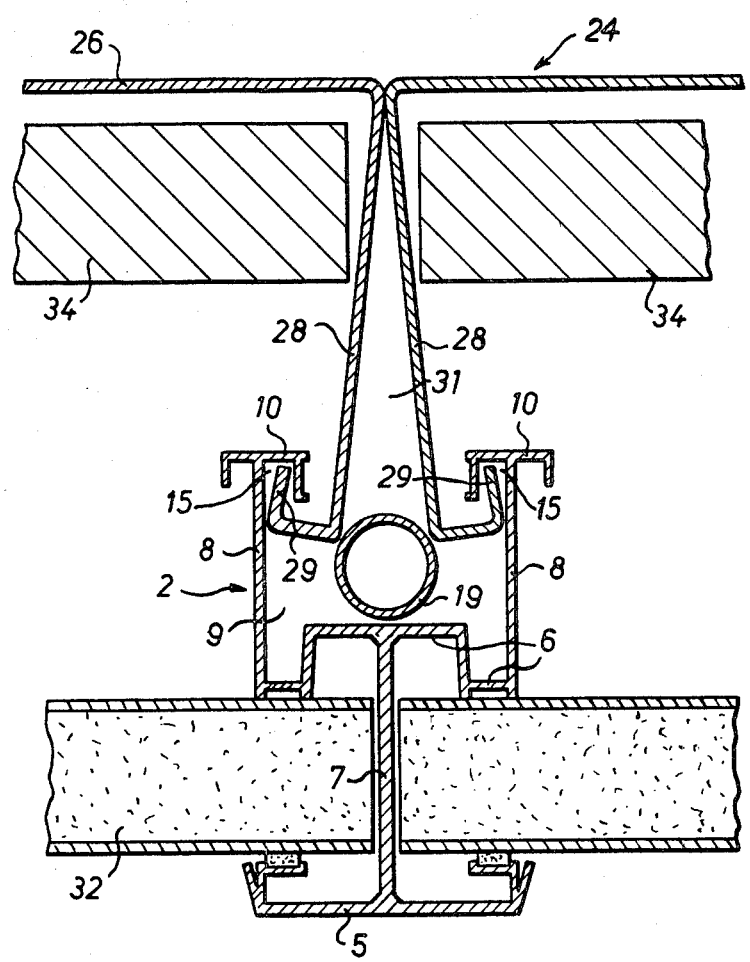
FIG. 3 represents a horizontal section through a vertical profile post with basement wall elements attached to it.

The cross-section construction of vertical profile post 2 is shown in detail in FIG. 3. It consists of an outer transverse web 5, a centre web 7, an inner transverse web 6 and parallel legs 8 extending from the latter. Legs 8 have one U-shape transverse web 10 each at their free ends forming one vertical, longitudinal groove 15 each. The two parallel legs 8 limit a recess 9 which opens to the inside of the house. Therefore the cross-section of the profile posts 2 is essentially a combination of a T-section and a U-section.

Figure 2:
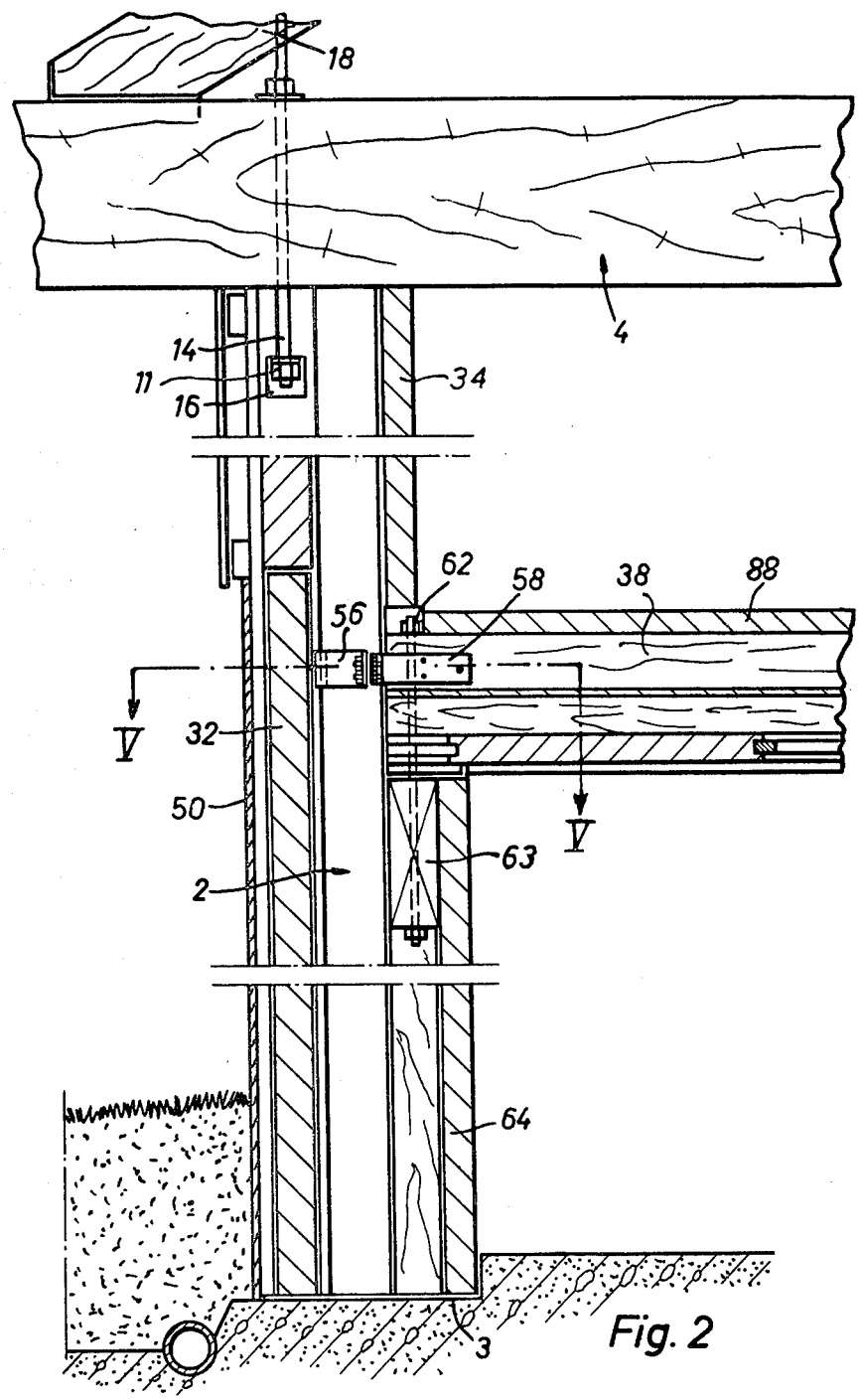
FIG. 2 represents a vertical section through one execution variant with interior elements.

The connection of each horizontal roof girder 4 with a related vertical profile post 2, as can be seen in FIG. 2, is made by means of a tension bolt 14, which penetrates the horizontal roof girder 4 in one bore. In the centre web 7 of each vertical profile post 2, close to its upper end, there is positioned one opening 16 to take up a nut 11. The lower end of the shank of tension bolt 14 has a longitudinal groove or slit which engages in the centre web 7 of the vertical profile post 2, as is described in more detail together with FIG. 8. The nut 11 is placed on the grooved end of tension bolt 14, engaging in opening 16. By clamping it, a force is exerted which contracts the two elements.

Rafters 18, made preferably of wood, as seen in FIGS. 1 and 2, are placed on the upper side of the horizontal roof girders 4. In addition, there are steel cables 20 which horizontally penetrate the top of the centre webs 7 of the vertical profile posts 2 and are braced on the outside in order to provide a support for the vertical profile posts 2. Other steel cables 20 are also located in the horizontal roof girders 4. The vertical profile posts 2 are spaced and braced from each other preferably by horizontal tension bolts.

In the basement, as shown generally in FIG. 1 and in detail in FIG. 3, there are vertically placed individual basement wall elements 24 along the inside of the profile posts 2. These consist preferably of aluminium or other suitable materials and include a flat plate section 26 and two legs 28 sloping downward at the ends and forming an essentially U-shape cross-section (when seen in a horizontal plane as in FIG. 3). The two legs 28 are tapered toward each other so that a wedge-shape opening 31 forms between two neighbouring basement wall elements 24 (see FIG. 3). The individual basement wall elements 24 rest against each other and their width is sized such that any two such basement wall elements 24 side by side can be arranged between two vertical profile posts 2. The ends 29 of the legs 28 of the basement wall elements 24 are bent to form an U-shape and engage between the two parallel legs 8 on a related vertical profile post 2, in which they are secured by a vertical bracing tube 19, or other securing elements. In the braced condition, the bent ends 29 engage in vertical grooves 15 of the vertical profile posts 2, formed by transverse tabs 10 at the ends of parallel legs 8. The bracing tube 19 is only inserted from above after the basement wall elements 24 have been installed and ensured that the basement wall elements 24 are secured in their respective positions.

Parallel to the plate element 26 of the basement wall elements 24, protective boards 34 are inserted, and these may, for example, be made of expanded plastic or impregnated corrugated cardboard.

Panel elements 32 with protective sheet at the outside are installed between the inner and outer transverse webs 5 and 6 of the vertical profile posts 2 and are adapted in height to correspond with the terrain. Panel elements 32 may be constructed of a core of cork particles sandwiched between particle board outer panels utilizing adhesive and considerable heat and pressure. Panel elements 32 may also be expanded polystyrene beads sandwiched between inner layers of particle and outer layers of aluminium sheeting utilizing adhesive, heat and pressure.

In the part of the vertical profile posts 2 extending above basement level, timber cores 36 are used in a dual manner as a reinforcement of the vertical profile posts 2 for heat insulation. The horizontal floor girders 38 are supported by the upper edge of the basement wall elements 24 and preferably contain one shoulder 40 each. Flooring is laid on floor girders 38.

Figure 4:
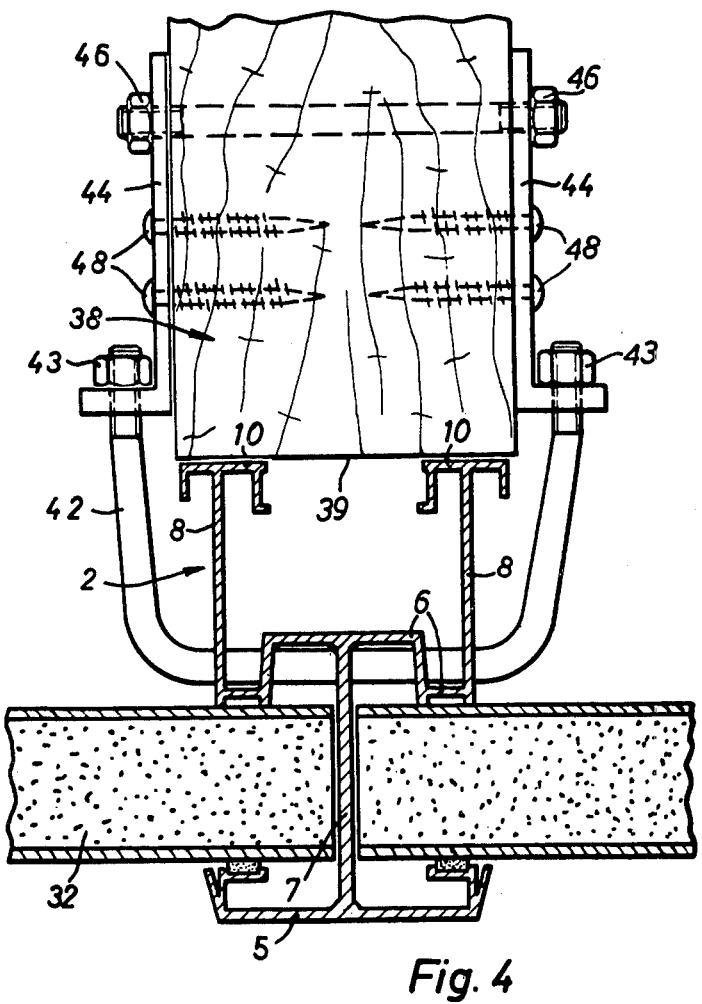
FIG. 4 represents a horizontal section through one floor girder, mounted to one vertical profile post.

FIG. 4 shows the fastening of one floor girder 38 to one vertical profile post 2. Angular tabs 44 are attached on both sides of the floor girder 38 by means of bolts 46 and screws 48. An U-shape bracket 42 engages in the tab 44 and is secured by nuts 43 at the ends. The brackets 42 penetrates a bore in the vertical profile post 2 in such a way that the bracket 42 is held both by the parallel legs 8 and by the centre web 7. The face 39 of the floor girder 38 is supported by the transverse tabs 10 at the end of the parallel legs 8, when nuts 43 have been tightened.

Figure 5:
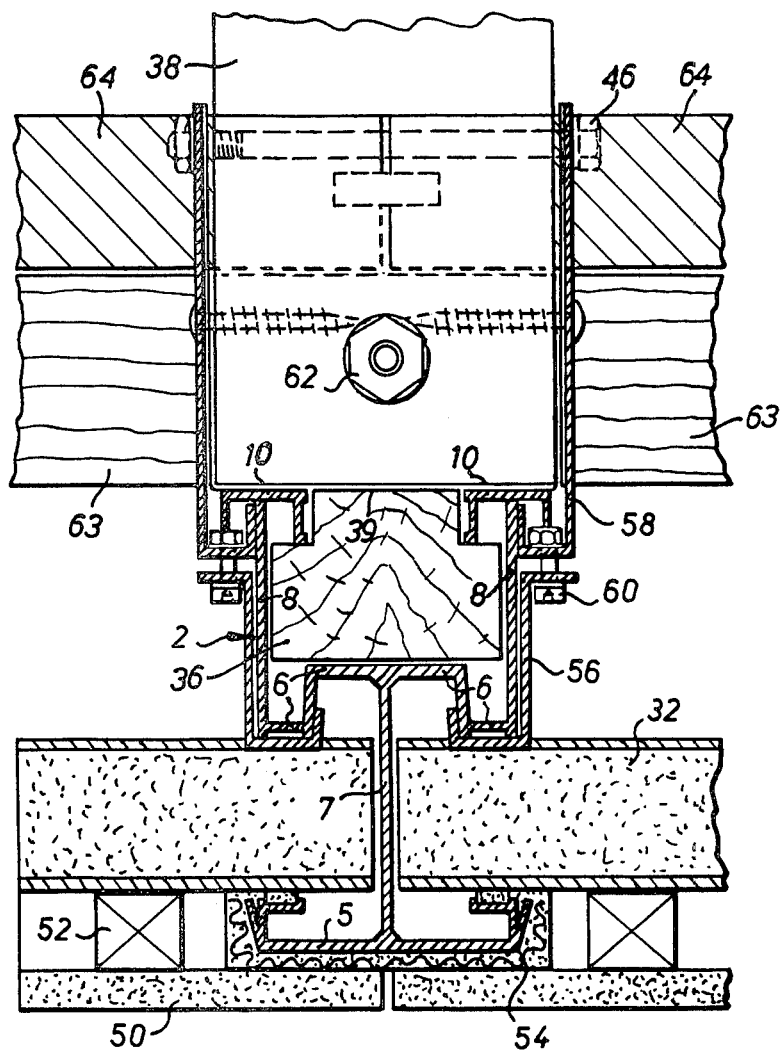
FIG. 5 represents a horizontal section taken along the line V—V in FIG. 2.

FIGS. 2 and 5 (the latter in detail) show a variant suitable for buildings with interior fittings. In place of a bracket 42, as shown in FIG. 4, there are a pair of nearly Z-shape attachment elements 56, which grip behind the transverse webs 6 of the vertical profile post 2. Tabs 58 are attached to the respective elements 56 by means of bolts 60, allowing the floor girders 38 to be secured against the transverse tabs 10 of the vertical profile post 2. A vertical tension bolt 62 penetrates floor girder 38 and a rectangular binding rafter 63, horizontally installed, on the underside of the joist. Supporting wall elements 64 are provided on the inside of the building on which the floor elements are placed.

On the outside of the building (as shown in FIG. 5), the outer transverse webs 5 of the post 2 are surrounded by an insulation layer 54 to enhance heat insulation properties. External facade elements 50 are fastened to the separating walls 32 by means of spacers 52. The panel-type separating walls 32 are inserted between the outer transverse webs 5 and the inner transverse webs 6 of the vertical profile posts 2. In this way, the vertical profile posts 2 carry a stable, insulation efficient three-wall structure, i.e. facade elements 50, separating walls 32, and interior wall elements 64.

A variant for fastening the floor girder 38 to the vertical profile post 2 is to provide the retaining tab 58, which engages in an outer vertical groove formed by the parallel legs 8 and the transverse tab 10, with a tensioning device. This tensioning device contains a cone which engages on one side in an opening or a longitudinal hole by means of a nut which rests in floor girder 38 (similar to screw-type connection 46 shown in FIG. 4) to pull the face 39 of the floor girder 38 against the transverse tabs 10 of the vertical profile post 2.

Another variant is characterised by extended tension bolts 14, which penetrate the rafters 18 as well as the horizontal roof girder 14 and draw these against the horizontal roof girder 14.

Figure 6:
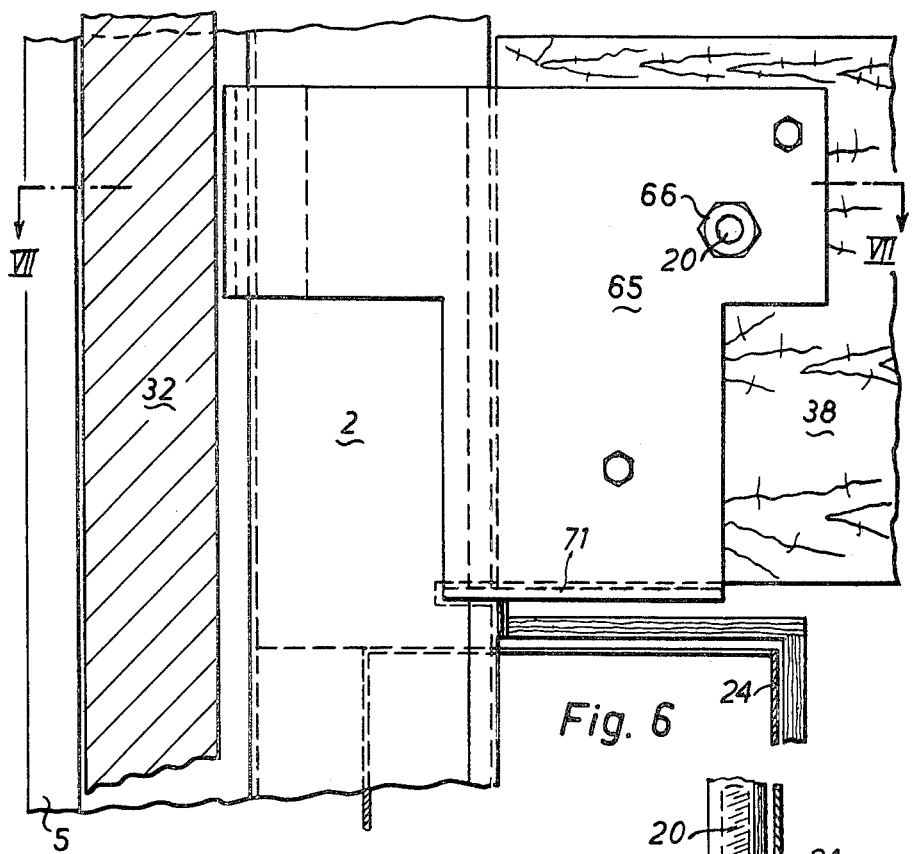
FIG. 6 represents a side elevation view of a joint variation used to attach a floor beam to a vertical profile post.
Figure 7:
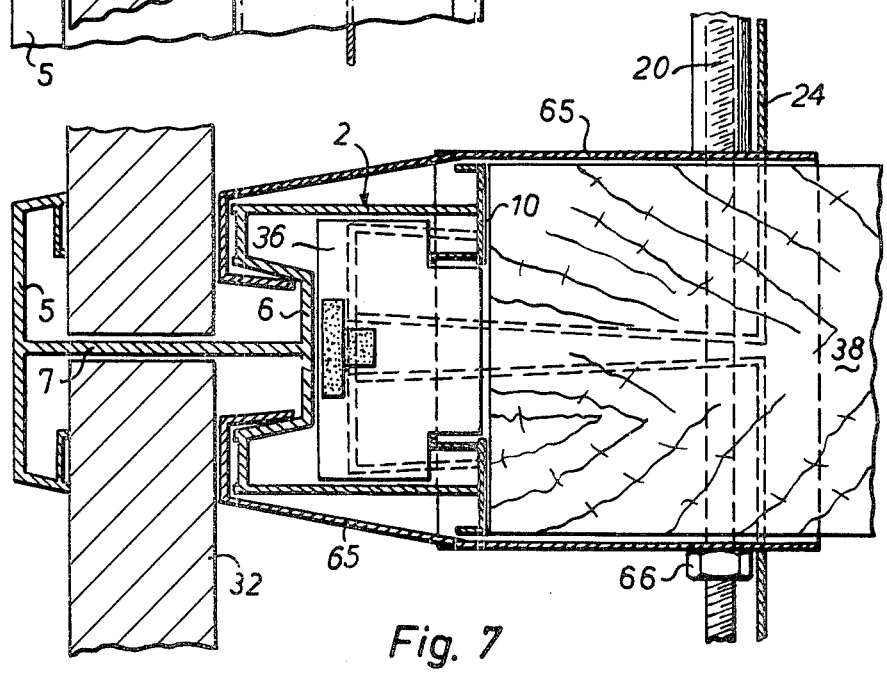
FIG. 7 represents a plan elevation view along the lines VII—VII as illustrated in FIG. 6 of a variant of a basement floor beam attached to a vertical profile post.

FIGS. 6 and 7 illustrate a further method and means of securing a floor girder 38 to a vertical profile post 2, which method is alternative to those illustrated and discussed above in association with FIGS. 4 and 5. A post connector 65 preferably made of sheet steel is secured to floor girder 38 by a bolt 66. When the girder 38 is being installed, connector 65 is tipped upwardly about bolt 66, the girder is slid down the post 2 from the top, and then, when in place, connector 65 is tilted horizontally and snapped in place about post 2 behind the inner transverse web 6. Connector 53 may then be nailed to girder 38 for strength.

Figure 8:
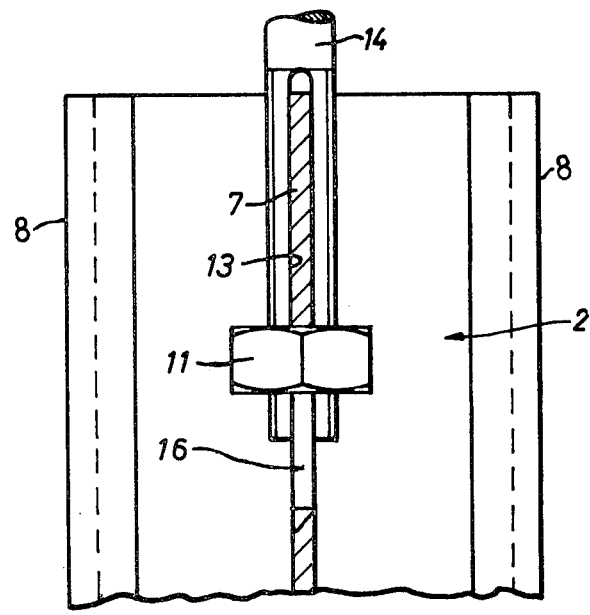
FIG. 8 represents a detail of the tension-bolt connection.

FIG. 8 represents a detail of the tension-bolt connection. The bolt 14 has therein a longitudinal slit 13 at least at one end position. The central web 7 of a vertical profile post 2 has an opening 16 spaced from the front end. The longitudinal slit 13 engages the end portion of the web 7 and is secured by screwing a nut 11. The nut 11 is supported by the upper end of the opening 16 in the web 7.

Figure 9:
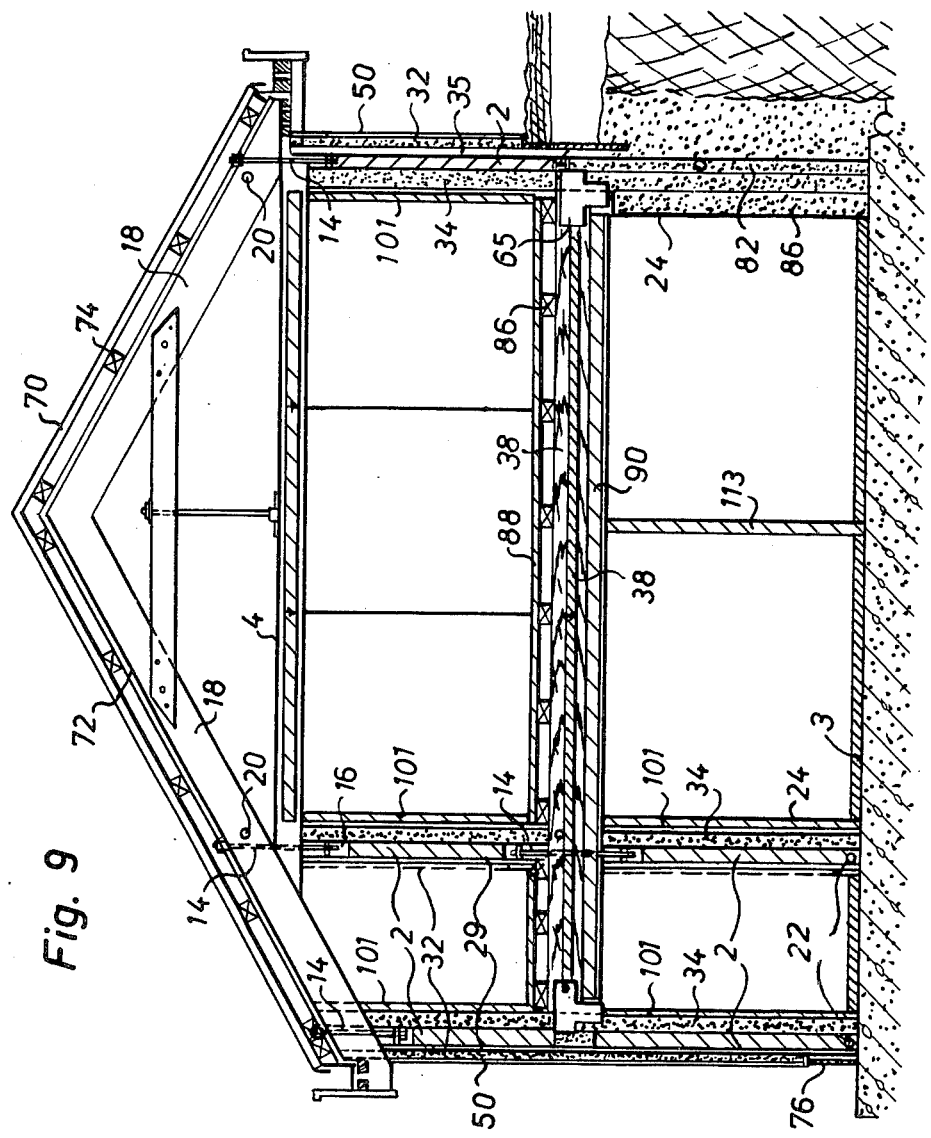
FIG. 9 represents a cross-section side elevation view of a house construction.

Referring to FIG. 9, which represents a side elevation cross-section view of a completed house construction partly excavated into the side of a hill, it may be seen that, except for the part that is underground, which preferably is of aluminium, the basic frame-work for the exterior walls consists of vertical profile posts 2, external facade elements 50, insulating panels 32, interior panels 34, and internal facade sheets 24, connected and fitted together as shown. The roof, including exterior shingles 70 or the like, and underlying sheeting 72, and bracing 74, are mounted on rafters 18, which are secured together by steel cables 20, and secured to the vertical profile posts 2 by menas of tension bolts 14.

The basement floor 3 is normally poured concrete, with a floor finish of some conventional type above it. The basement wall that is against the excavated earth can be constructed of some suitable earth contacting material. Preferably, aluminium inner panels 82 with expanded polystyrene foam cores and aluminium exterior sheets for corrosion protection against ground fluids are used. The vertical profile post 2 on that side of the building are secured on the foundation by bolts. An outer wall base plate 76 made of an inert material seals the outer walls with the surrounding ground. The interior surface can be a basement wall element 24 to conform with the opposite and adjacent walls of the basement. Reinforcing laterally extending steel cables or rods 20 can be secured in the basement walls and/or the profile posts 2.

The main floor of the building is supported by laterally extending floor girders 38. These are each connected at the end to respective posts 2 by connecting means such as that disclosed and discussed above in relation to FIGS. 4 and 5, including bolts 42 or 46, or by the means discussed previously in relation to FIGS. 6 anf 7. The floor girders 38 support cross beams 86, floor sheeting 88, and overlying carpet or other floor material.

The basement ceiling is formed by panels 90, held in place betweend the parallel floor girders 38. The main floor ceiling is constructed in a manner somewhat analogous to the floor between the basement and the main floor, although the main floor ceiling does not have to be able to support a traffic load and hence can be of somewhat lighter construction. Roof girders 4 are positioned between and connceted to respective posts 2 and rafters 18. Panels are positioned between the roof girders 4 to form the floor ceiling.

Figure 10:
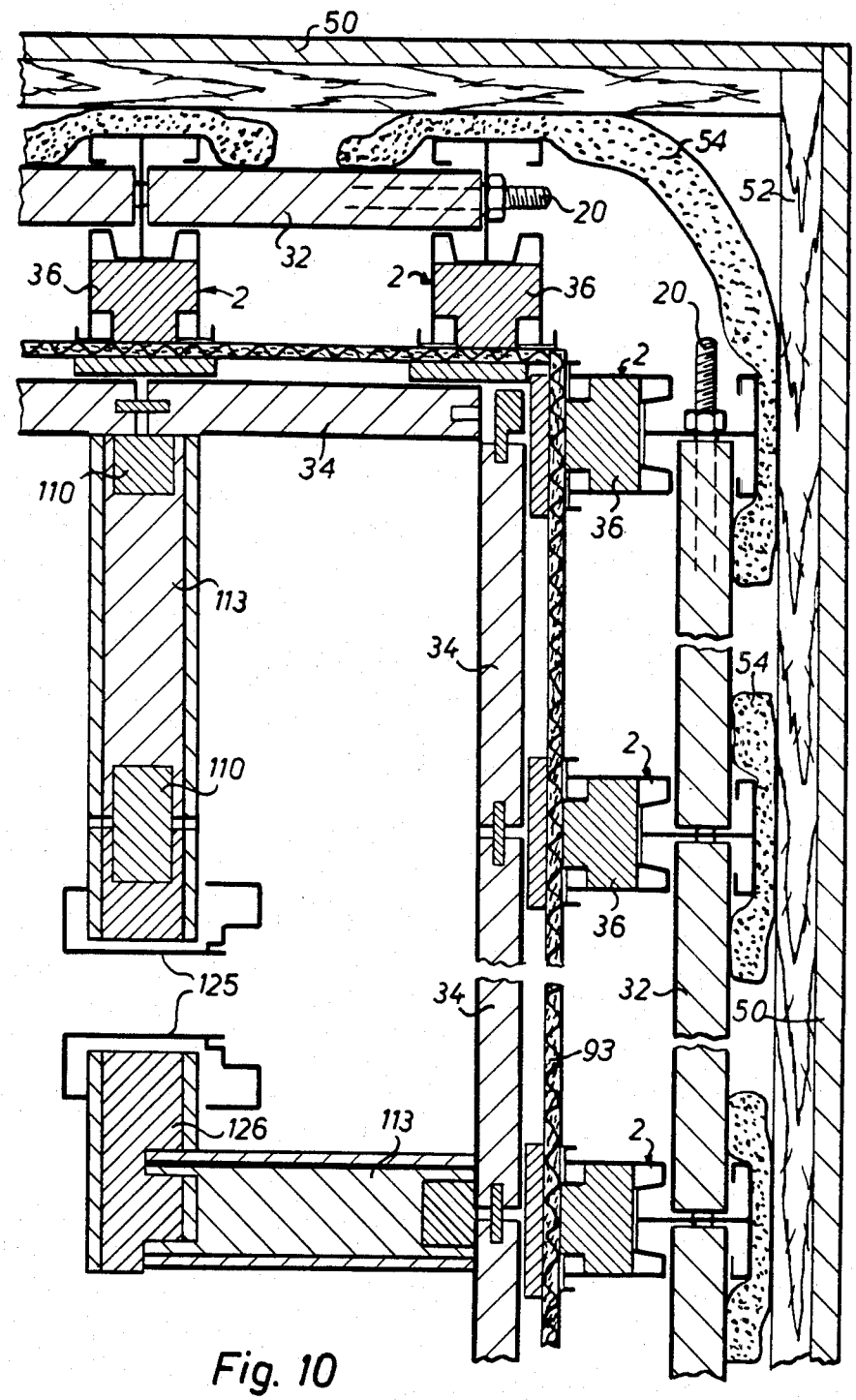
FIG. 10 represents a horizontal cross-section view of an exterior wall construction including a corner.

As shown in FIG. 10, which illustrates a top sectional view of the typical wall construction, the walls can be constructed of three basic layers of materials, if required, for maximum heat insulation benefits, both to keep heat in the building in cold climates or keep heat out of the building in hot climates. One or two of these walls can be omitted, if required.

The vertical profile posts 2 are secured specially by steel rods 20. Panels 32 are positioned between each of the posts 2. A vertical timber core 36 is positioned within each post 2. Thermal insulation 54 is installed between the panels 32 and the outer wall 50. Inner walls constructed of panels 34 are secured to the inner sides of posts 2. FIG. 10 also shows sections of wall detail made up of support posts 110, wall sandwich panels 113, door frames 125, and corner support posts 126. An insulation layer 93 against loss of heat is arranged between panels 32 and panels 34.

Figure 11:
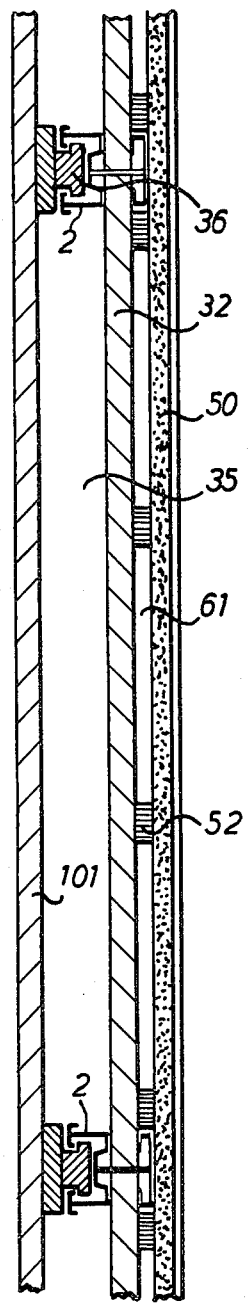
FIG. 11 represents a detailed horizontal cross-section view of a wall construction.
Figure 12:
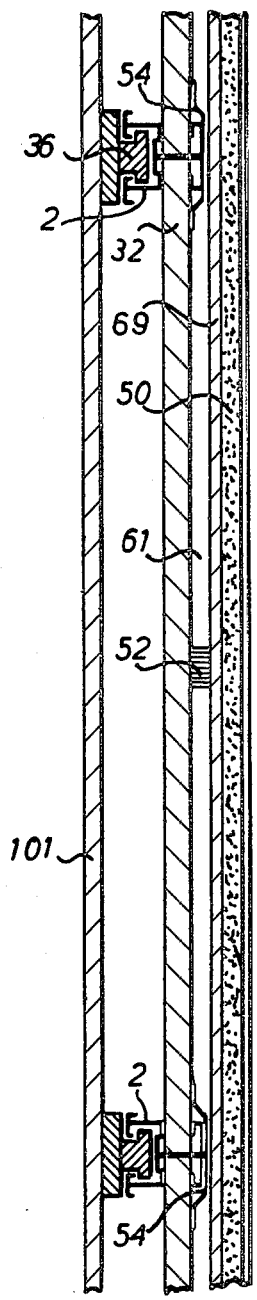
FIG. 12 represents a detailed horizontal cross-section view of a wall construction, with insulation in the wall cavity.

FIGS. 11 and 12 illustrate plan section view of wall sections useful respectively for a hot weather country and a cold weather country. The wall construction shown in FIG. 12 has insulation 69 in the wall cavity. The wall construction shown in FIG. 11 has only air in the cavity 35 and 61. Cool air from the basement, or as generated by an air conditioner by be circulated through this cavity to help keep the walls cool.

The panels 32 positioned between the vertical profile posts 2, and elsewhere in the building are known and can be constructed in a number of alternative conventional ways.

Figure 13:
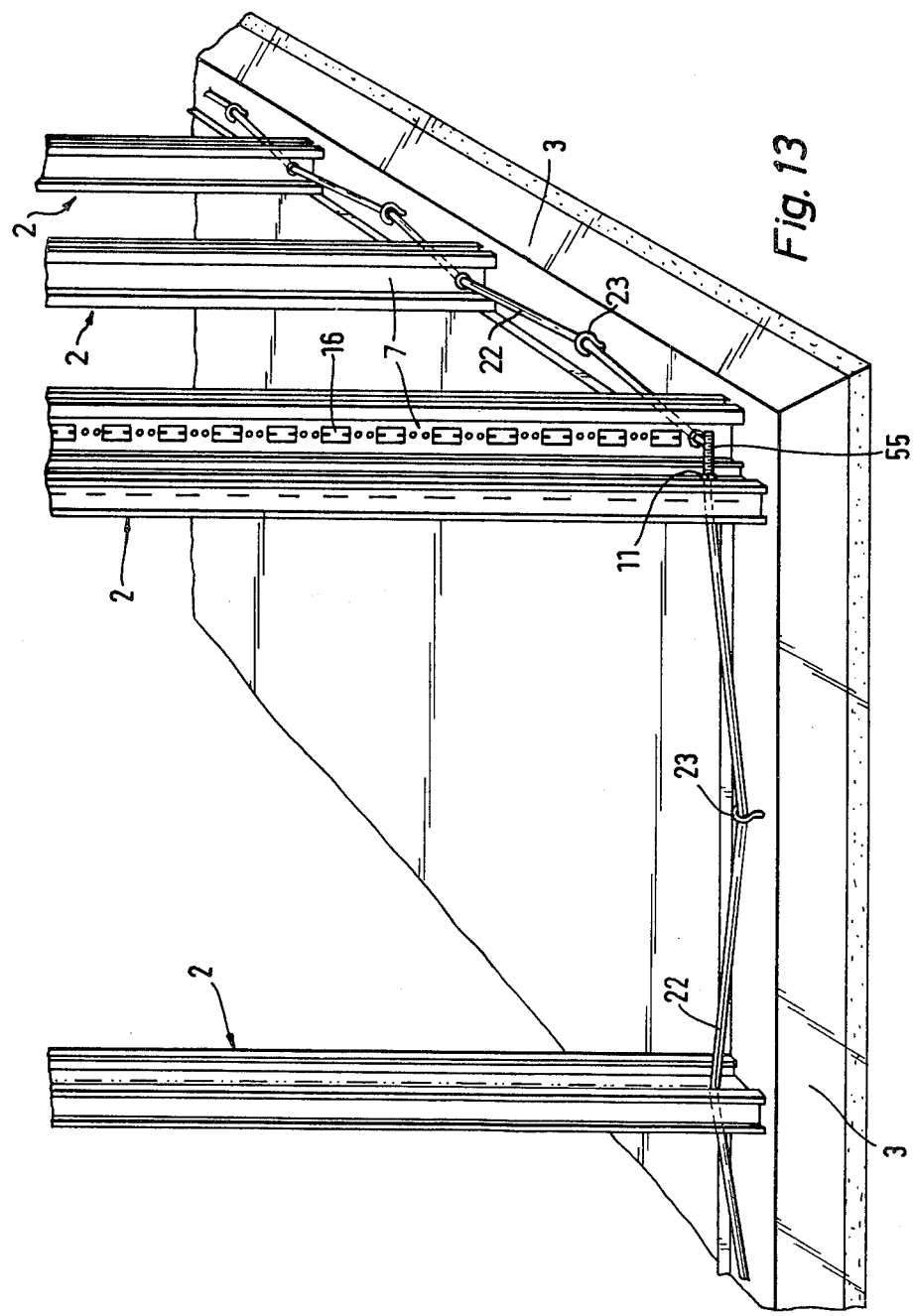
FIG. 13 represents a perspective view of a skeleton structure with vertical profile posts which are guyed down to the foundations by means of a wire cable.

FIG. 13 shows a skeleton structure in which firstly the vertical profile posts 2 are erected. They rest on foundations 3 which are preferably made of solid building materials such as concrete. The lower ends of the vertical profile posts 2 are set down freely on these foundations; however, it would also be conceivable for a short section to be built in the foundation. On their central web, the vertical profile posts 2 are provided with H-shaped cut-outs 16 which are spaced at intervals and extend preferably over the whole height. In the lowest zone of each of these vertical profile posts 2, and at a defined distance from their lower and face, a bore is provided, through which a wire cable 22 is drawn. Between adjacent vertical profile posts 2, there is at least one lug 23 or other holding device for the wire cable 22, anchored in the foundations 3. The bore in the vertical profile posts 2 for the wire cable is located above the lugs 23 so that when the wire cable 22 is tensioned with a tensioning device a downwards traction effect on the foundations 3 is exerted by the vertical profile posts 2. The tensioning device is constructed in such a way that the wire cable 22 is connected to a threaded bolt 55 on which is screwed a nut 11 by means of which the tensioning force can be produced. The lug 23 may also be construced as a hook, ring or tubular part, permitting relative displacement therethrough of the wire cable 22 in its longitudinal direction. In this way, the stability of the building structure is greatly increased in the event of earthquakes or storms.

Figure 14:
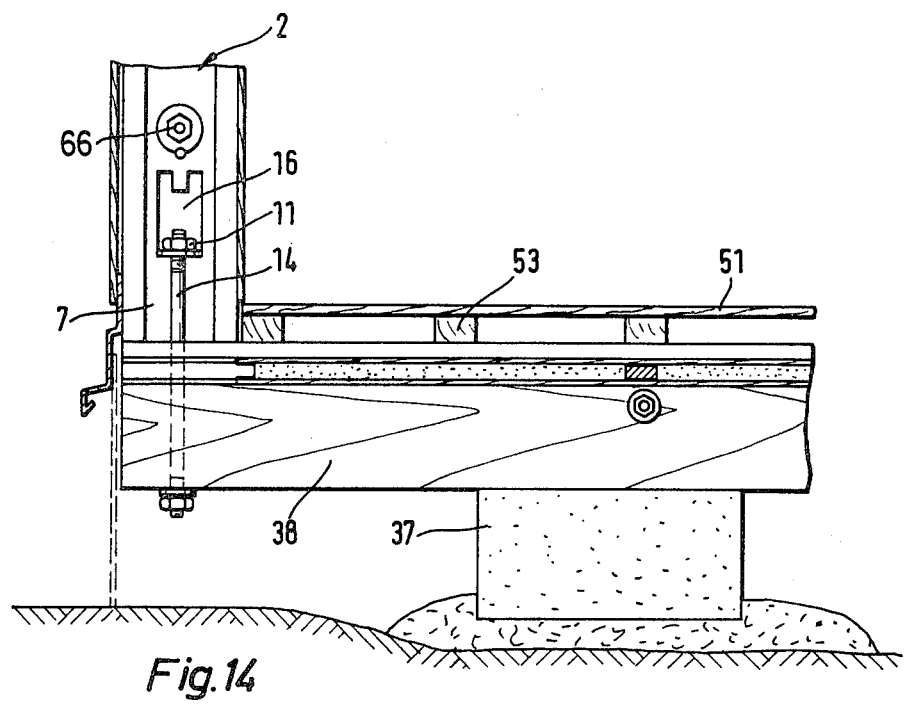
FIG. 14 represents a vertical section through a base section with a floor girder screwed to a vertical profile post.

FIG. 14 represents an embodiment of a building structure which does not have a basement. The floor joists 38 each rest on supporting blocks 37 which are made, for example, from aeroconcrete and rest directly on the ground. The vertical profile posts 2 in this instance are tensioned on floor joists 38 made of wood by means of a tensioning bolt 14 which is slit longitudinally through its upper section and engages with the central web of the vertical profile post 2 as explained together with FIG. 8. The nut 11 is located in the hole 16 through the vertical profile post 2 and thus holds the two slit parts of the tensioning screw 14 together and makes it possible to set the vertical profile posts 2 firmly on the floor joists 38. A framework 53 of lathes is built on the floor joists 38, and the floor panels 51 or the like are laid on this framework.

Figure 15:
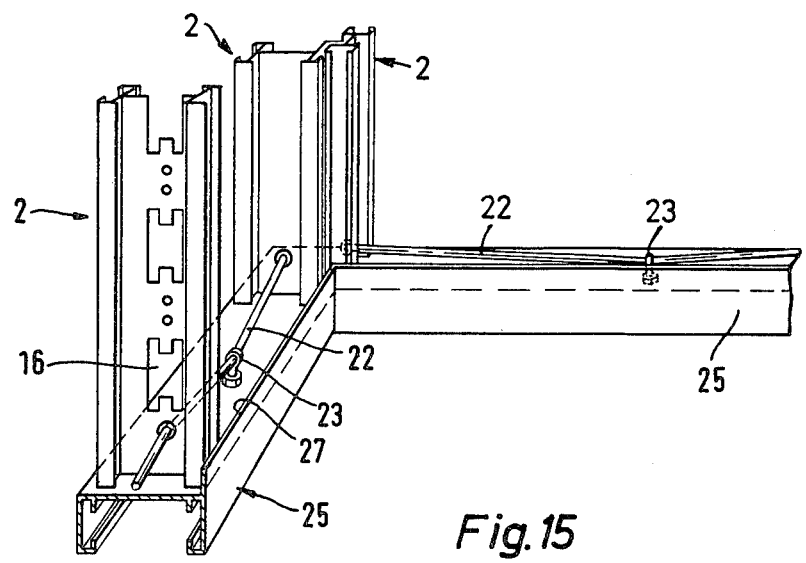
FIG. 15 represents a perspective illustration of an embodiment in which the vertical profile posts are guyed onto a frame consisting of profile rails.

FIG. 15 shows a generally similar construction to that in FIG. 13, except that, instead of foundations made of building materials, floor rails 25 made of metal are provided. These are connected together at the corners by welding to form a frame. Again, the vertical profile posts 2 rest freely on these base rails 29 and are urged downwardly by the wire cable 22. An upwardly extending flange 27 on the inner face of the base rail 25 acts as a stop for the vertical profile posts. The plurality of wire cables 22, each extending over only one longitudinal face of the building and tensioning at its respective end, can be used, or only one single wire cable 22 may be used, extending over all four sides of the building.

Figure 16:
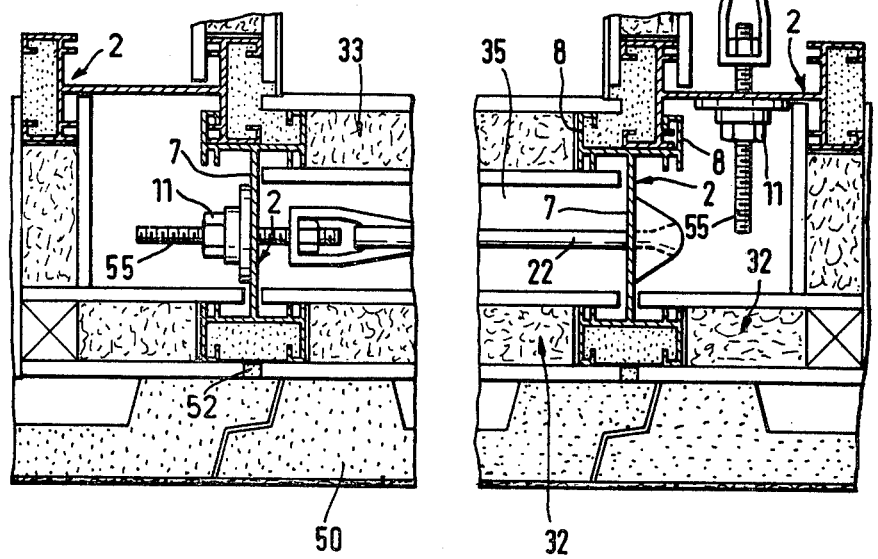
FIG. 16 represents a horizontal section through a double-walled embodiment.

FIG. 16 shows a horizontal section through a building structure in which a double-wall type of construction is used. In this structure, the H-shaped vertical profile posts 2 are disposed so that the central web 7 extends at right-angles to the respective side of the building. In the corners, these vertical profile posts 2 engage with each other and thereby provide a high degree of rigidity. The outer wall panels 32 and the inner wall panels 33 are all equipped with projecting plate elements which engage in the vertical posts 2. Between these outer and inner wall panels 32, 33, there is a space 35 in which the lower part of the wire cable 22 with the tensioning devices 11, 55 is located. Facade elements 50 made, for example, out of concrete, are fixed on the outer wall panel 32. This double-walled method of construction provides an additional insulation and ventilation effect, useful in both cold and hot regions. In hot regions, the air in the space 35 may be cooled, which provides an air-conditioning effect.

Figure 17:
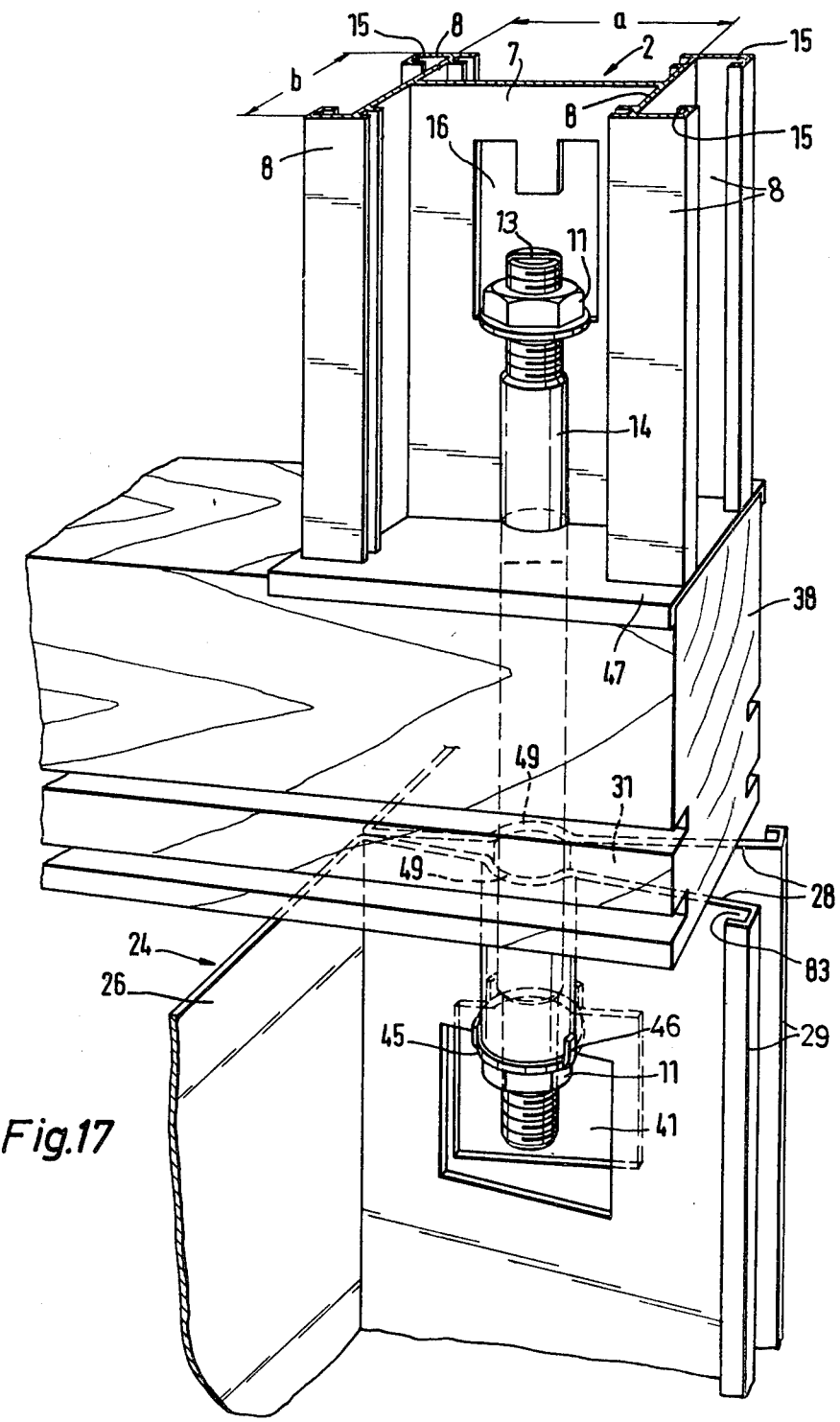
FIG. 17 represents a perspective illustration of a bolt connection of a basement wall part to ceiling beams and vertical profile posts.

FIG. 17 shows a perspective illustration of the connection of the basement wall element 24 to a floor joist 38 of wood or other material and to a vertical profile post 2. The basement wall elements 24, which have a U-shaped horizontal section and are made, for example, from aluminium, have a flat vertical plate element 26 and a bent-out leg 28 on both sides. When two of such individual basement wall elements 24 are juxtapositioned together, a V-shaped space 31 is produced between the respective legs 28. A bowed-out section 49 for the passage therethrough of a tensioning bolt 14 is provided towards the top of the legs 28 in the central region. At a certain distance from the upper edges of these basement wall elements 24, rectangular holes 41 are provided in the legs 28, and a nut 11, or a bolt-head of a tensioning bolt 14, is located in these holes. The nut 11 lies against a washer 45 adapted to the hole 41 and provided with bent-up taps 46 to hold it in position.

The horizontal floor joist 38 is supported on the upper edge of the basement wall elements 24. A piece of sheet metal 47, serving to distribute the pressure, is disposed between the floor joist 38 and the vertical profile post 2 placed thereon. A nut 11 is located in the H-like cut-out 16 in the central web 7 of this vertical profile post 2, being screwed onto the longitudinally slit tensioning bolt 14. The central web 7 of the vertical profile post 2 projects therefore into this longitudinal slit 13 in the tensioning bolt 14, so that a secure connection is obtained when the nut 11 is screwed down tightly. The central web 7 and the longitudinal central axis of the floor joist 38 are located at least approximately in the same vertical plane. The ends of the parallel legs 8 are provided with transverse tabs 10 which extend parallel to the central web 7. The ends of the tabs 10 are bent inwards to form vertical grooves 15, so that they are open in direction of the web 7. The distance "a", which corresponds to the length of this central web 7 should amount to at least one and one third times the width "b", and preferably to approximately one and seven-eighths times this width which corresponds to the transverse tab 10.

Figure 18:
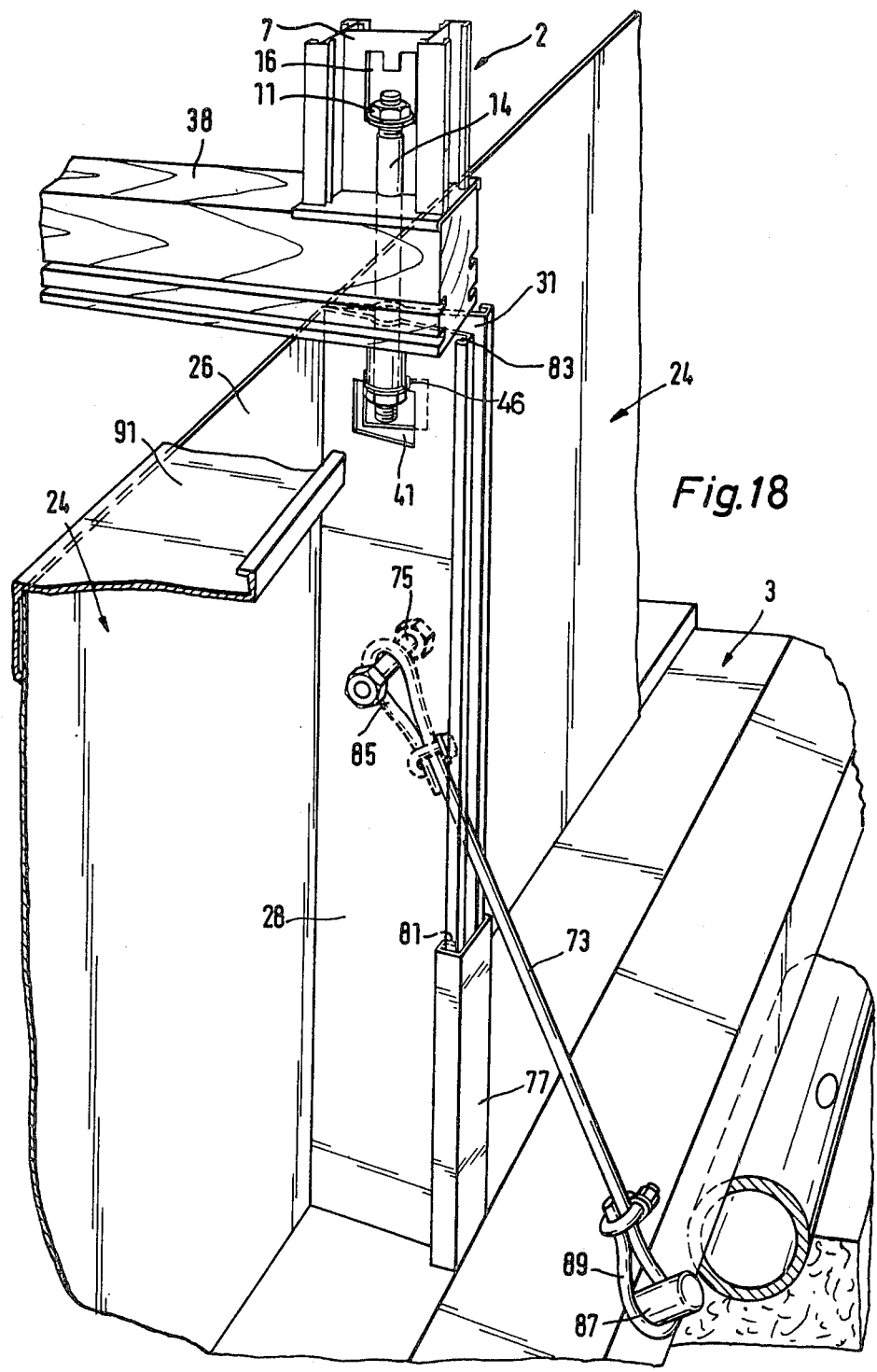
FIG. 18 represents a perspective illustration in which a basement wall element rests at the base of a concrete formulation and are supported by cable means.

In FIG. 18, an embodiment is shown in which the basement wall element 24 rest at the base on the concrete foundations 3. The V-shaped space 31 formed by two adjacent bent-out legs 28 is open towards the outside of the building and is covered on the outside by a vertical rail 77. This has a substantially U-shaped cross-section and each end engages behind the respective channels 83 at the ends of the legs 28 by inwardly-projecting rail sections 81 of the rail 77. In order to enable the vertical rails 77 to be inserted in place, the end face of the floor joist 38 is set back relative to the channel 81. The legs 28 are traversed by a through-bolt 75 wich holds one loop 85 or a wire cable 73 or pull rod serving as a guying element. The wire cable 73 projects into the V-shaped space 31 between two adjacent legs 28 and extends obliquely downwardly to a picket 87 which is seated in the foundations 3 or has been hammered into the ground. The wire cable 73 is formed into a loop 89 in the vicinity of the picket 87. It is also possible to effect adjustable tensioning of the wire cable 73 by using a tensioning bolt or other tensioning means. This oblique tensioning is carried out mainly on sloping sites, or when the building is provided with a basement on one side, to secure the basement wall elements against lateral pressure of earth piled against the building. A ceiling profile rail 91 with an angular cross-section is placed on the top edge of the basement wall elements 24.

Figure 19:
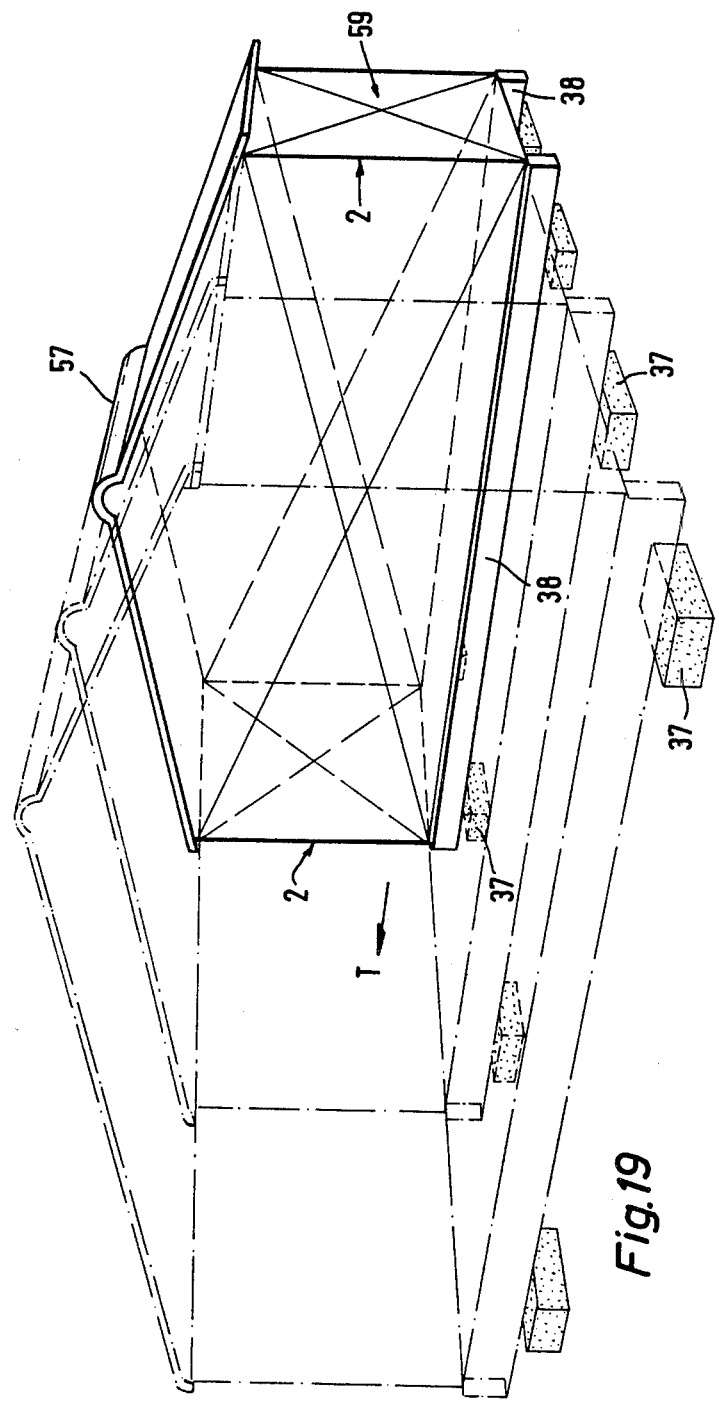
FIG. 19 represents a schematic perspective illustration of a building structure where a transportation container is being used to accomodate the remainder of the house.

FIG. 19 shows schematically how part of the building structure can serve as a transportation container in which the remaining structural elements of the building which is to be erected are contained. Two floor joists 38 can be used as skids. In this way, the container 59 can be transported with the aid of a traction vehicle in snow an in upright position, in the direction of the arrow T, the length of the building being governed by the length of the floor joists 38, and the width corresponding approximately to the distance between the two floor joists 38. The dimensions of the transportation container 59 in the longitudinal direction of the roof ridge 57 is less than that of the finished erected building. In this way, additional packing costs are avoided and it is possible to deliver to site even large-roomed buildings with a small transportation volume.

As will be apparent to those skilled in the art in the light of the foregoing disclosure, many alterations and modifications are possible in the practice of this invention without departing from the spirit or scope thereof.

What is claimed is:

1. Building construction utilizing a skeleton-type structure having
    substantially vertically disposed post members (2) and substantially horizontally disposed girder members (4);
    at least one of said members being formed with a web portion (7);
    and tensioning means for drawing and clamping said post members and girder members together, wherein
    the web portion (7) extends longitudinally in said at least one member from an end adjacent the respective member, said web portion being formed with an aperture (16) spaced from the end of the respective member;
    the tension means comprises a tension bolt (14) which penetrates one of the respective members and is formed at the end opposite said respective member with a longitudinal slit (13) extending from the end of the bolt into the shaft (14) thereof to form a split end portion of the shaft (14) of the bolt, said slit being dimensioned for engagement over a portion of the web (7) of said member,
    and a screw nut (11) screwed on said tension bolt, fitting within the aperture (16) of the web portion and being supported on and tightening the web portion of the respective member against another member by engagement of said nut with the terminal wall of the aperture.

2. Construction according to claim 1, wherein the tension bolt (14) penetrating said one member extends beyond the respective member (2, 4);
    and bolt head holding elements (24) are provided, said elements comprising
    a sheet-like structure formed to have, in cross section, a V-shaped aspect, the legs of the V being located adjacent respective sides of the extending portion of the tension bolt, and juxtaposed with respect to each other to define, between them, an open V-shaped space;
    said elements being, further, bent or bulged and dimensioned to receive the tension bolt inwardly of the bent or bulged portion thereof;
    and wherein the legs (28) of said elements are formed with an opening (41) for receiving a screw nut (11) for attachment to said tension bolt (14).

3. Construction according to claim 2, including a foundation (73); wherein said bolt head holding elements comprise basement wall elements, adapted to rest on the foundation;
    the V-shaped space of said elements being oriented to be open towards the outside of the building having said construction;
    oblique guying elements (73) anchoring the basement wall elements to the foundation;
    and guy holding elements (73) passing transversely through said V-shaped bolt head holding elements, attached to said guying elements, said guying elements being positioned within the space defined by the V-shaped elements.

4. Construction according to claim 1, further comprising disassemblable vertically arranged basement wall elements (24) having approximately a U-shaped horizontal cross section,
    two legs (28) of said basement wall elements extending from the base thereof, and engaged in a recess (15) in said vertical post member.

5. Construction according to claim 4, wherein the end of the legs (28) of the basement wall elements (24) have a U-shaped bend, open to the outside of the building;
    the legs of neighboring basement wall elements form a wedge-shaped recess (29) opening to the inside of the building;
    said vertical post members (2) being formed with vertical grooves (15), the leg ends of the basement wall elements directed towards the inside of the building being engaged in said vertical grooves;
    and a holding member (19) locking said legs extending towards the inside of the building in the grooves (15) of the vertical post, said groove and leg ends being, respectively, shaped to form an interengaging, interlocking projection-and-recess connection held in position by said holding member (19).

6. Construction according to claim 4, wherein the legs of neighboring basement wall elements extending towards the inside of the building have a length dimensioned to accomodate a protective plate element (34).

7. Construction according to claim 1, including a plurality of steel cables (20) penetrating said vertical post members (2) at their upper ends, said steel cables extending in an essentially horizontal direction, to brace said posts.

8. Construction according to claim 3, wherein some of said girder members form floor girders (38);
    said floor girders being positioned above the upper side of said basement wall elements (24);

and wherein said tension bolts (14) pass through the floor girders and connect together said bolt holding elements forming the basement wall elements, the floor girder, and said vertical posts.

9. Building construction according to claim 1, wherein said post members comprise I-beam shaped elements having a web, the length (a) of which is at least one and one third times the width (b) of the parallel cross element of the I-beam post element.

10. Building construction according to claim 1, comprising
a foundation; the post members include
a plurality of vertical posts (2) having central webs positioned on said foundation and extending upwardly therefrom, spaced from each other;
a wire cable (22) extending parallel to external walls of the building construction and attached to the webs of said vertical posts;
holding elements (23) secured to said foundation, located intermediate the vertical posts and deflecting said wire cable (22) from a straight-line direction between the webs of said posts, and securing the wire cable to the foundation, said wire cable being arranged in the shape of a V which is open upwardly;
and tensioning means attached to the wire cable beyond said vertical posts for applying a downwardly directed force vector to said posts towards the foundation and exerting downward pressure on the foundation by the vertical posts independently of the weight of building elements carried by said posts, and to hold said posts in upwardly directed position against the foundation.

11. Building construction according to claim 10, wherein two vertical post members (2) are located at the corners;
a horizontal girder member (38) being located beneath the base of said posts;
and tension bolts (14) holding the respective post member in vertical engagement with the horizontal girder member (38), said tension members engaging the post member and passing through the girder member.

12. Building construction according to claim 11, wherein said vertical post members comprise
I-shaped girder cross sections having flanges with bent-out extensions to permit interengagement of two adjacent vertical post members, when juxtapositioned with respect to each other in a corner location.

13. Building construction according to claim 10, further comprising basement wall elements (24) having an approximately U-shaped horizontal cross section;
the legs (28) of adjacent basement wall elements being bent inwardly to form inwardly directed V-shaped spaces (31), the legs each containing a bowed-out or bulged out portion (49);
and a tensioning bolt (14) passing through the V-shaped space in the bowed-out or bulged-out portion, and connecting the basement wall elements to a floor girder;
said basement wall elements, in the region of the bowed our bulged-out portion being formed with an opening dimensioned to receive a nut or bolt head connected to the tensioning bolt.

14. Building construction having external walls; comprising
a foundation;
a plurality of vertical posts (2) having a generally I-shaped cross section positioned on said foundation and extending upwardly therefrom, spaced from each other;
a wire cable means (22) extending essentially parallel to external walls of the building construction and attached to said vertical posts (2), said vertical posts being formed with respective bores therethrough, said wire cable means (22) penetrating respective bores in said posts;
holding elements (23) secured to said foundation, located intermediate the vertical posts and deflecting said wire cable means (22) from a straight-line direction between the posts, and securing the wire cable means to the foundation, said wire cable means being arranged in the shape of a V which is open upwardly;
tensioning means attached to the wire cable means beyond said vertical posts for applying a downwardly directed force vector on said posts towards the foundation and exerting downward pressure on the foundation by the vertical posts independently of the weight of the building elements carried by said posts, and to hold said posts in upwardly directed position against the foundation;
and wherein two vertical posts (2) are located at corners of the building construction and are juxtapositioned and angularly interengaged with respect to each other at said corners, the cable means (22) being secured to respective ones of the vertical posts at the corners extending in directions at angles to each other.

15. Building construction according to claim 14, wherein said vertical posts comprise
flanges with bent-out extensions to permit said interengagement of two adjacent vertical posts in a corner location.

16. Building construction according to claim 14, wherein said vertical posts have longitudinally extending webs;
and substantially H-shaped holes (16) are formed in said webs, spaced at recurring intervals over more than half of the length of the web.

17. Building construction according to claim 14, further including wall elements (32, 33) made of thermally insulating material, and placed on both sides of the space (35) in which the wire cable is located;
and a facade element (50) being placed at the outer side of the outer wall element.

18. Building construction according to claim 14, further comprising basement wall elements (24) having an approximately U-shaped horizontal cross section;
the legs (28) of adjacent basement wall elements being bent inwardly to form inwardly directed V-shaped spaces (31), the legs each containing a bowed-out or bulged out portion (49);
and a tensioning bolt (14) passing through the V-shaped space in the bowed-out or bulged-out portion, and connecting the basement wall elements to a floor girder;
said basement wall elements, in the region of the bowed our bulged-out portion being formed with an opening dimensioned to receive a nut or bolt head connected to the tensioning bolt.

19. Building construction according to claim 18, wherein a vertical member is positioned above the girder member;
and said tensioning bolt (14) passes through the girder member and into the vertical post member for engagement therewith and attachment thereto.

20. Building construction according to claim 14, wherein said posts have a web, the length (a) of which is at least one and one third times the width (b) of the parallel cross element of the I-shaped posts.

* * * * *